(12) United States Patent
Wong et al.

(10) Patent No.: US 8,330,639 B2
(45) Date of Patent: Dec. 11, 2012

(54) REMOTE CONTROLLER

(75) Inventors: Kwok Leung Wong, Causeway Bay (HK); Ka Ho Ng, Causeway Bay (HK)

(73) Assignee: Silverlit Limited, Causeway Bay (HK)

( * ) Notice: Subject to any disclaimer, the term of this patent is extended or adjusted under 35 U.S.C. 154(b) by 356 days.

(21) Appl. No.: 12/647,266

(22) Filed: Dec. 24, 2009

(65) Prior Publication Data

US 2011/0156943 A1    Jun. 30, 2011

(51) Int. Cl.
*H04L 17/02* (2006.01)
(52) U.S. Cl. ......... 341/176; 341/173; 345/156; 345/173
(58) Field of Classification Search .................. 341/176; 345/173
See application file for complete search history.

(56) References Cited

U.S. PATENT DOCUMENTS

| | | | | |
|---|---|---|---|---|
| 2002/0097229 A1* | 7/2002 | Rose et al. | ..................... | 345/173 |
| 2005/0065673 A1* | 3/2005 | Horst et al. | ..................... | 701/19 |
| 2007/0057922 A1* | 3/2007 | Schultz et al. | ................. | 345/173 |
| 2007/0236475 A1* | 10/2007 | Wherry | .......................... | 345/173 |
| 2007/0249422 A1* | 10/2007 | Podoloff | .......................... | 463/43 |
| 2008/0246723 A1* | 10/2008 | Baumbach | .................... | 345/156 |
| 2009/0051481 A1* | 2/2009 | Park et al. | ....................... | 340/2.1 |
| 2009/0158222 A1* | 6/2009 | Kerr et al. | ...................... | 715/867 |
| 2009/0219304 A1* | 9/2009 | Martin et al. | .................. | 345/684 |
| 2009/0256822 A1* | 10/2009 | Amireh et al. | ................. | 345/174 |
| 2009/0295753 A1* | 12/2009 | King et al. | ..................... | 345/174 |
| 2010/0079404 A1* | 4/2010 | Degner et al. | ................. | 345/174 |
| 2010/0271231 A1* | 10/2010 | Gottlieb | ................... | 340/825.22 |

\* cited by examiner

*Primary Examiner* — Brian Zimmerman
*Assistant Examiner* — Amine Benlagsir
(74) *Attorney, Agent, or Firm* — Greenberg Traurig, LLP

(57) ABSTRACT

A remote controller for toys includes a user interface which applies the low-cost capacitive sensing method with the remote controller. Users can touch and/or drag on a remote controller surface by fingers to remotely control the movement of R/C cars, planes, helicopters or a boat. The remote controller is essentially a flat faced unit and there is no need for protruding control sticks or pushbuttons. This controller is applicable to different types of remote control toys with digital proportional control on speed and steering control. The remote controller is a symmetric product design whereby the controller is easily operable with left and right hand conventions.

19 Claims, 12 Drawing Sheets

REMOTE CONTROLLER

BACKGROUND

This disclosure relates to remote controllers for toys. In particular it relates to toys which are movable over a surface or fly, and wherein the moving characteristics of the toy change.

Toy remote controllers normally are relatively bulky and have a multitude of physical switches, sticks and push buttons for operational purposes.

Capacitive sensors have been used in elevators and in home electrical appliances touch switches for many years. In the Applicant's knowledge, such sensors have not previously been used for toy remote controllers.

SUMMARY

This disclosure concerns a remote controller for toys, wherein the controller includes a user interface which applies the low-cost capacitive sensing method with the remote controller. Users can touch and/or drag on a remote controller surface by fingers to remotely control the movement of R/C cars, planes, helicopters or a boat. The remote controller is essentially a flat faced unit and there is no need for protruding control sticks or pushbuttons.

This disclosure is applicable to different types of remote control toys that use digital proportional control on speed and steering control. The remote controller is preferably a symmetric product design whereby the controller is easily operable with left and right hand conventions.

The present disclosure provides for a remote control device having a touch screen for remotely directing a toy. One or more capacitive sensing elements, in the form of touch pads, are located beneath the touch screen. The capacitive sensing elements are in an array or grid and operate with touch and drag characteristics such as to control direction and/or a speed. The touch pads are capable of detecting contact of the touch screen by an object, such as a human finger. When there is a touching and/or dragging on the touch screen as contacted by a human finger or other object in the region of the touch pad, the remote control transmits a signal to the toy to move in the direction and/or change the speed as signaled by the action on the touch pad.

The disclosure is further described with reference to the accompanying drawings and the detailed description.

DRAWINGS

Figure 1:
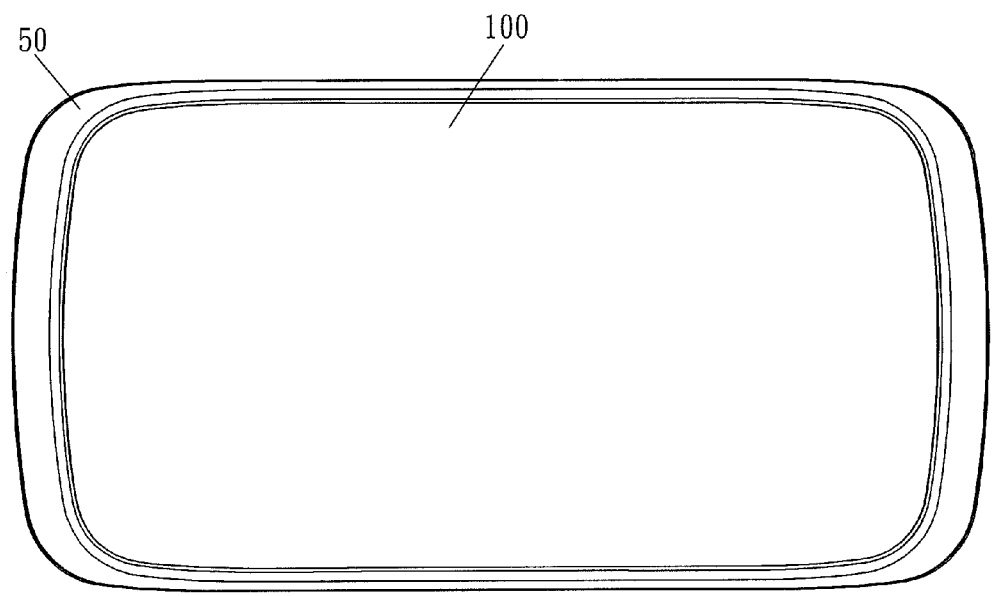
FIG. 1 is a top view of a remote control device having a touch screen including capacitive touch pads.
Figure 2:
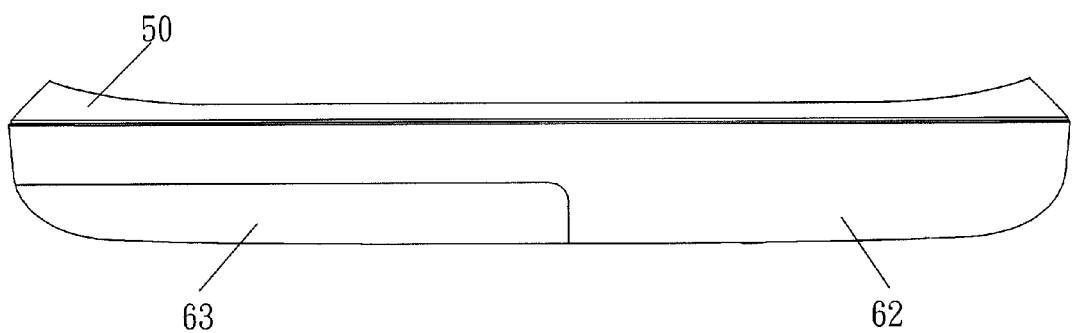
FIG. 2 is a left side view of a remote control device having a touch screen including capacitive touch pads.
Figure 3:
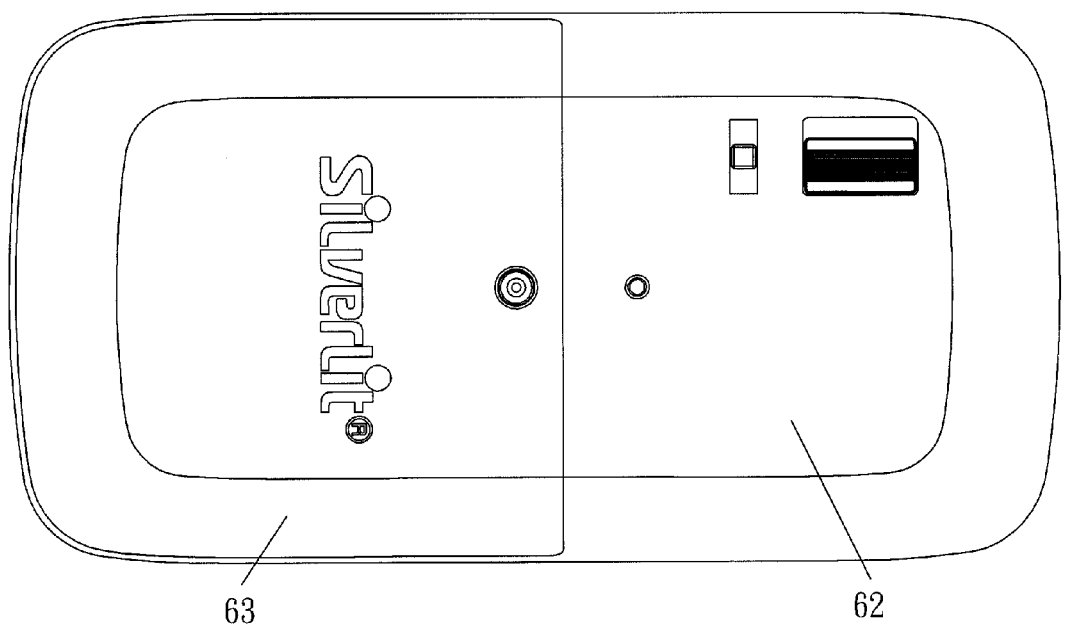
FIG. 3 is a bottom view of a remote control device having a touch screen including capacitive touch pads.
Figure 4:
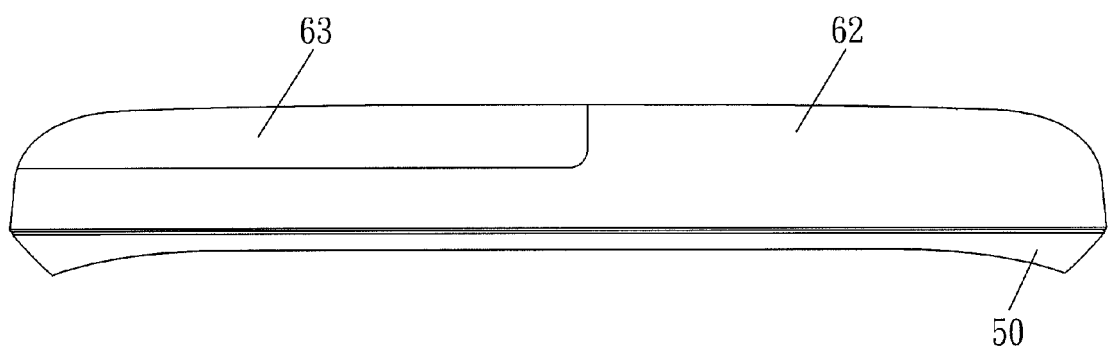
FIG. 4 is a side view of a remote control device having a touch screen including capacitive touch pads.
Figure 5:
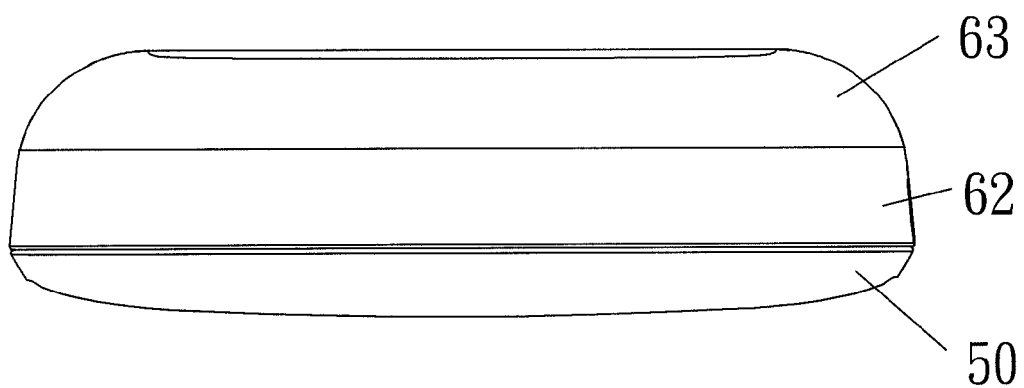
FIG. 5 is an end view of a remote control device having a touch screen including capacitive touch pads.
Figure 6:
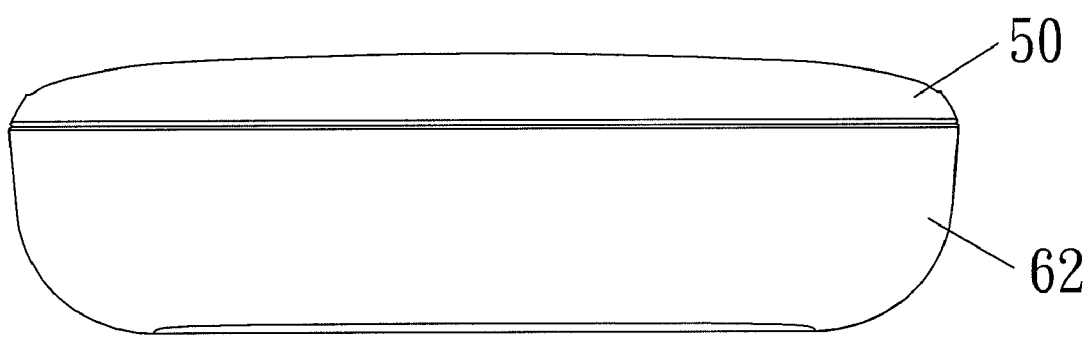
FIG. 6 is an opposite end view of a remote control device having a touch screen including capacitive touch pads.
Figure 7:
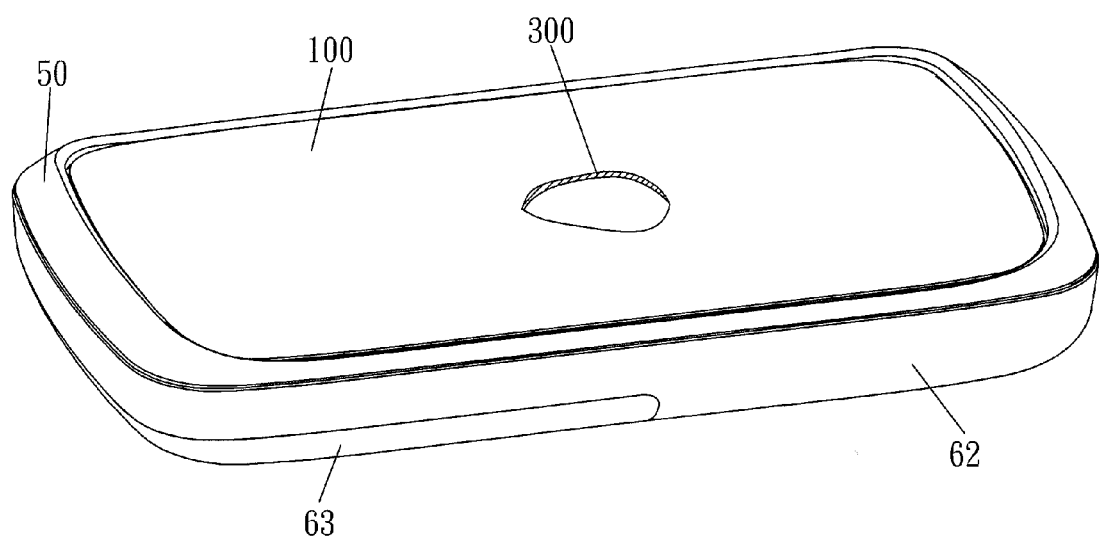
FIG. 7 is a perspective top view of a remote control device having a touch screen including capacitive touch pads. An over layer is partly cut away.
Figure 8:
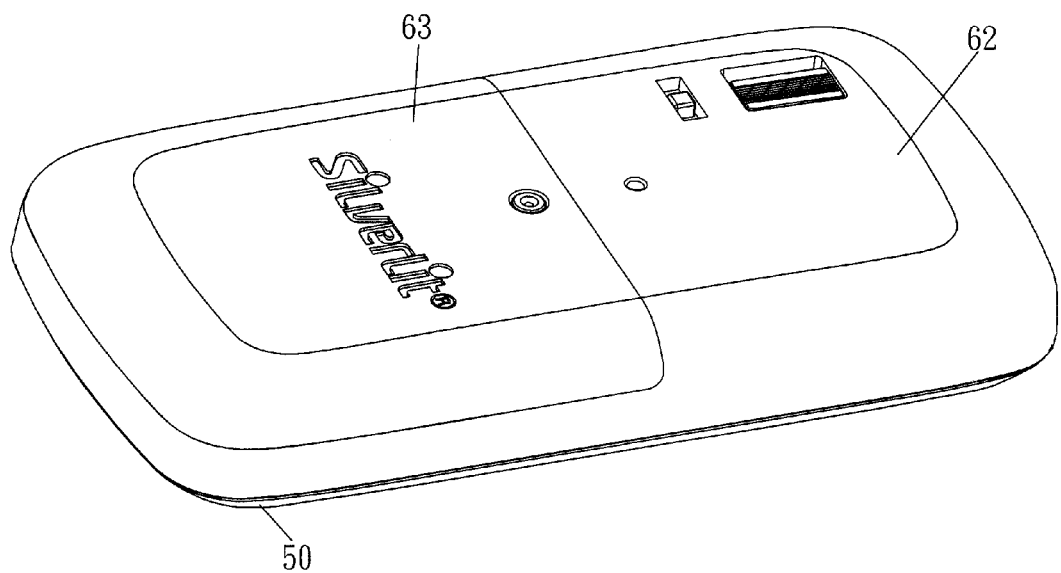
FIG. 8 is a perspective bottom view of a remote control device having a touch screen including capacitive touch pads.
Figure 9:
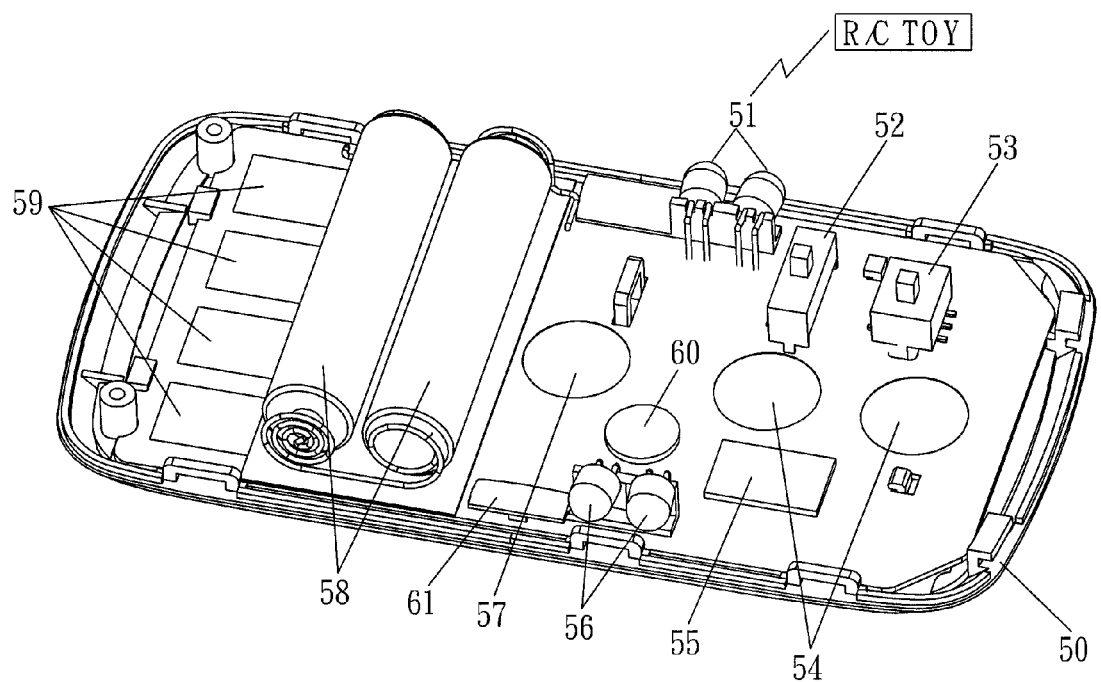

FIG. 9 is a perspective view from inside the device towards the top of a remote control device having a touch screen including capacitive touch pads. The different components of the controller can be seen in position in the body of the housing. An R/C toy is represented in communication with the controller.

Figure 10:
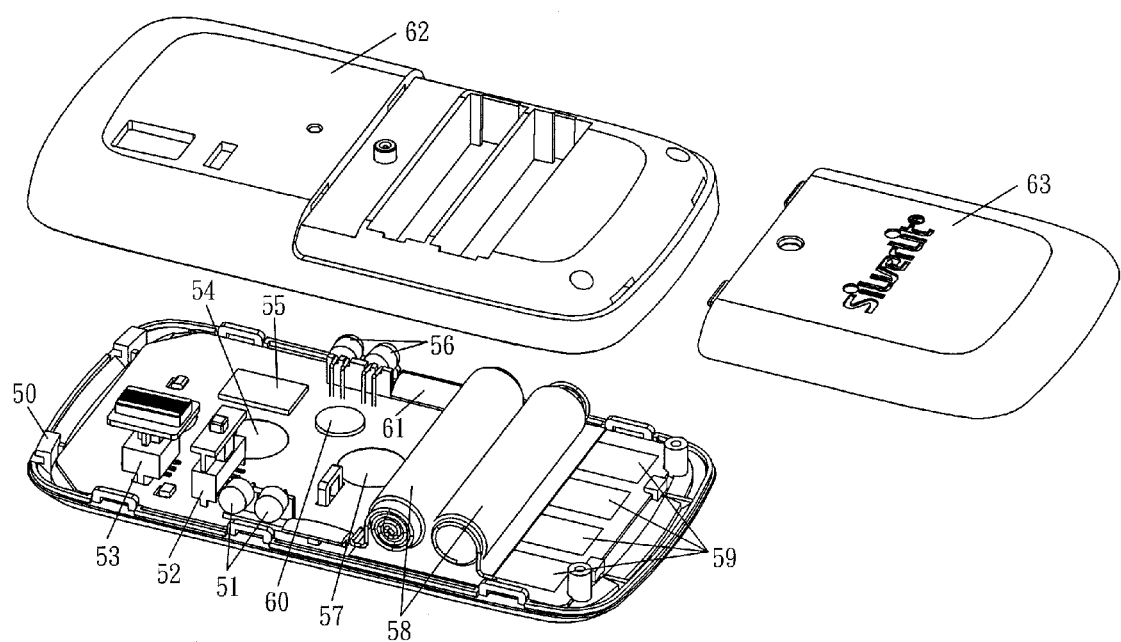

FIG. 10 is a is a different perspective view from inside the device towards the top of a remote control device having a touch screen including capacitive touch pads. The different components of the controller can be seen in position in the body of the housing. The bottom component of the housing and battery door is also shown.

Figure 11:
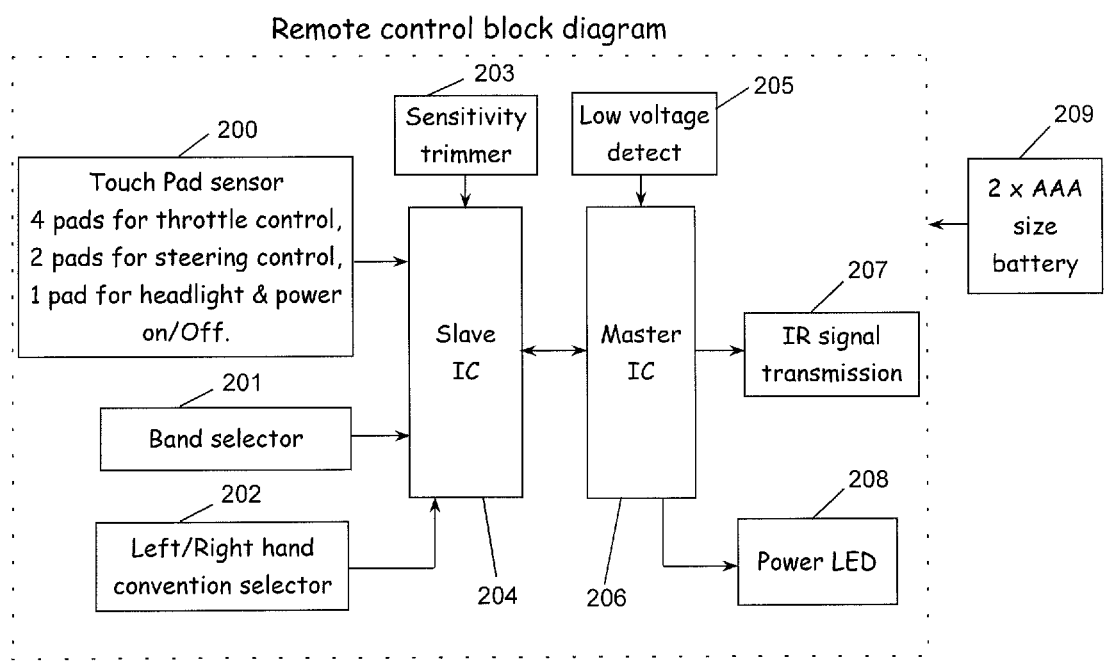

FIG. 11 is an electrical schematic of an exemplary control circuit for use in a remote control device including capacitive touch pads.

Figure 12:
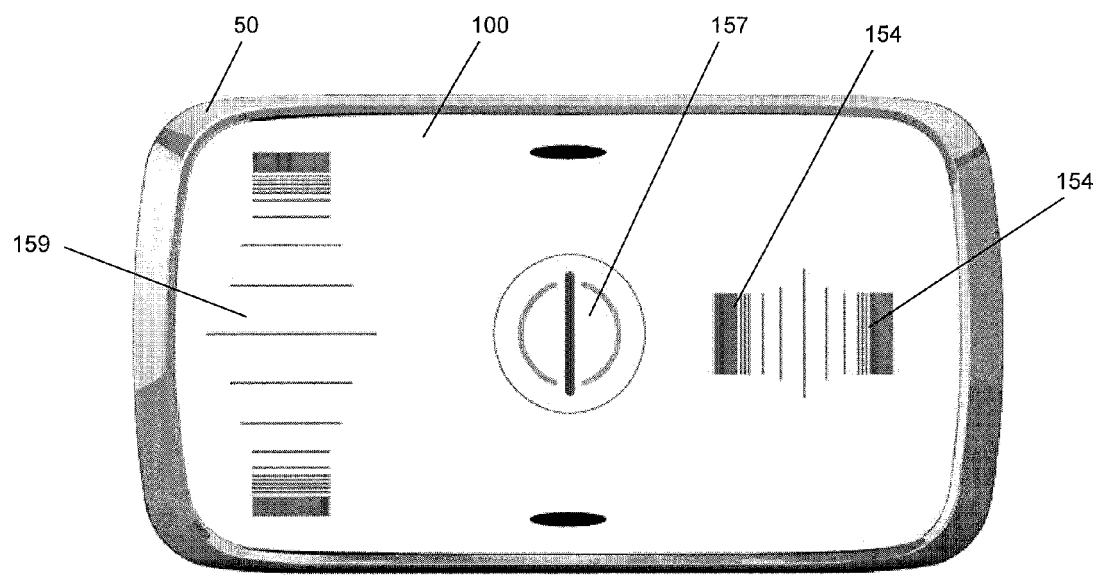

FIG. 12 is a top view of a remote control device having a touch screen including capacitive touch pads. The graphic ornamentation is shown.

DETAILED DESCRIPTION

There is a remote controller for controlling a remote controlled movable toy, the movement being in the air, on the ground or in water. The controller comprises a touch surface which includes at least two capacitive touch sensors. Each touch sensor corresponds to at least one of touch or drag whereby the movement of the toy is alterable in correspondence to the touch or drag operation of at least one of the touch sensors.

There is a control circuit connected to each of the touch sensors. The control circuit is operational digitally with the touch sensors and being such that at least one of touching or dragging on the sensor causes a change in capacitance of a touch sensor. This acts to generate a control signal.

A transmitter is connected to the control circuit. On receipt of a control signal by the transmitter, the transmitter transmits a direction or speed signal from the controller to a toy. A change in the capacitance of the touch sensor caused by at least one of touch or dragging is translated as the control signal corresponding to a change in a direction or speed of the toy.

The touch sensors are mounted in a controller housing. The housing includes a body and an operational face, an overlay material on the operational face, and the sensors being located below the operational face.

The sensors include a first array or grid of sensors, the first array or grid being inhibited from reacting to progressive changes in transverse pressure relative to the face.

The sensors in the array are connected in a physical location relative to the operational face such that change of transverse pressure over different sensors in the array in a lateral sense across the operational face effects a translation into a dragging action to cause a requisite control signal from the controller to the toy.

The sensors in the array are serially arranged such that changes in different sensors are serially communicated to the control circuit, and wherein the speed of changes from one sensor to other effects changes in the direction or speed signal being transmitted by the transmitter.

The sensors in a first array and the control circuit and array are arranged such that a release of pressure from sensors in the array affects a stop effect on the toy whereby the toy would be either stationary or slow down to a stationary position. Braking effect is activated by one-time-swipe the touch pads 159 from top to bottom while the toy is moving forward.

There is at least one further touch sensor, the further touch sensor being for operational characteristics unrelated to direction or speed change of the toy. There can be left and right hand designated touch sensors related to the control circuit. The operation of the left or right hand touch sensor renders the array of sensors responsive to a left or a right person respectively with relatively similar operational effect and experience respectively. The other touch sensor 57 is the power and headlight on/off. While the left or right convention is determined by a mechanical switch 53.

The touch sensors in the array relate to the control circuit, such that operation of the touch sensor in the array of sensors permit the generation of transmission signal which is selected from the group of stop, accelerate, decelerate, maintain constant speed, proceed forwardly, proceed in reverse, turn left, turn right and toy ID (states vehicle A, B and C) and headlight status too. There can be at least three transmission signals which are selected from the group of stop, accelerate, decelerate, maintain constant speed, proceed forwardly, proceed in reverse, turn left, and turn right. In other cases there can be at least six transmission signals which are selected from the group of stop, accelerate, decelerate, maintain constant speed, proceed forwardly, proceed in reverse, turn left, and turn right. In yet other cases there can be the generation of transmission signals which include all of stop, accelerate, decelerate, maintain constant speed, proceed forwardly, proceed in reverse, turn left, turn right, toy ID and headlight status.

The sensors are preferably responsive to both touching and dragging on sensors thereby to cause a change in capacitance of a touch sensors and thereby act to generate a control signal. The controller characteristic is such that when in the drag mode, the faster a player drags over the sensor array, the faster can be the change of direction or change of speed of the vehicle being controlled by the controller. Thus the controller affects a change in acceleration of direction and/or speed. Similarly if the drag is slower, the slower is the change of speed or direction, namely there is change in deceleration of the speed and/or direction which is controlled by the controller. In a touch mode where there is only touching of the sensor in a steady, non dragging manner there can provide different changes in the direction or speed, namely a more steady change which is neither accelerating or decelerating change.

The disclosure also relates to a method of controlling a toy comprising the steps of energizing one or more touch sensors; detecting a change in the touch sensor. The direction and speed represented by the touch sensor in which a change is detected; and a control signal corresponding to the direction and speed represented by the touch sensor in which a change is detected is transmitted. The control circuit is operational digitally with the touch sensors and is such that at least one of touching or dragging on the sensor causes a change in a touch sensor.

In the example remote control device includes a touch screen, one or more capacitive touch sensors. As shown in FIG. 11 there is a control circuit (203, 204, 205 and 206), a power source 209, and a transmitter 207. The remote control device may remotely direct the speed and steering of a toy, such as a remote control vehicle or airplane.

This is affected by operating the touch sensors on the touch screen and transmitting control signals to the toy. The signals transmitted by remote control device may control the speed and direction of the toy.

The touch screen display can be graphically arranged within the display area by objects such as a finger, a hand, or a stylus. The touch screen may be a plastic surface of the housing on device with or without printed or painted graphics.

The touch screen may include a protective layer. Such as a coating with a material, such as indium tin oxide or a similar material that may conduct a continuous electrical current across touch screen. Such a protective layer allows touch screen FIG. 12 to be capacitive and therefore capable of sensing contact with an object, such as a finger.

The touch screen may also include one or more capacitive touch sensors manufactured using conventional etching of printed circuit boards. The touch sensors operate in touch and drag mode and thereby represent a direction and/or speed. For example, touch sensors may represent a direction such as forward, backward, left, or right, and/or a speed such as stop. The touch sensors are connected to the control circuit.

The control circuit may include electronics such as memory, programmed instructions stored in memory, and a processor. The control circuit (203, 204, 205 and 206) may be connected to power source and transmitter. The control circuit sends the appropriate control signal to the transmitter. For example, if control circuit detects a variance in capacitance on the touch sensor representing "left," control circuit may then send the appropriate control signal to transmitter. The transmitter may send a remote control vehicle the appropriate directional and/or speed signals upon receipt of the control signal from the control circuit.

The components of the remote controller of the disclosure as illustrated are as follows:
- 50—Top housing
- 51—Upper IReds for transmitting Infra-red signal. It will be activated if user select left hand for throttle control
- 52—Band selector to select different channel A/B/C car
- 53—Left/right hand convention selector
- 54—Left or Right touch pads which depends on selector 53
- 55—Touch sensor MCU for detecting the change in capacitance in touch pads
- 56—Lower IReds for transmitting Infra-red signal. It will be activated if user select right hand for throttle control.
- 57—Power and Headlight on/off touch pads
- 58—Power source—2*AAA batteries
- 59—Swipe pads for controlling the throttle speed, brake, forward & backward direction
- 60—MCU for controlling IRed and LEDs and communicate with Touch sensor MCU
- 61—Power LED reflector
- 62—Bottom housing
- 63—Battery door
- 100—Top face of the top housing
- 154—Graphical representations on top face 100, as associated with touch pads 54
- 157—Graphical representations on top face 100, as associated with touch pads 57
- 159—Graphical representations on top face 100, as associated with touch pads 59
- 200—Electrical block representation of Touch Pad sensor
- 201—Electrical block representation of Band selector
- 202—Electrical block representation of Left Hand Right convention Selector
- 203—Electrical block representation of Sensitivity Trimmer
- 204—Electrical block representation of Slave MCU
- 205—Electrical block representation of Low Voltage detector
- 206—Electrical block representation of Master MCU
- 207—Electrical block representation of I/R Signal Transmitter
- 208—Electrical block representation of Power LED
- 209—Electrical block representation of Battery Power source

300—Top overlay as shown diagrammatically with a cut out

The device includes a portable size top housing. A PCBA is put under the top housing for both electronic components and sensing surface. The gap between the plastic inlay and PCBA should keep minimum so as to maximize the sensitivity of sensors. There is a touch screen display with a 0.5 mm thin plastic layer on the surface of top housing.

The sensors are made of copper pads on a PCB surface. Through the measurement of capacitance change on the pad, a MCU can distinguish which pads have been touched.

There can be at least three, and preferably at least four copper pads aligned in line on PCB for swiping/dragging detection. The surface area of each pad is around 130 mm$^2$. With a minimum of three pads, it is possible to know two important parameters—drag/swipe direction (forward or backward) and speed. Then, there is thereby provided the interface for users to have digital proportional control on speed of toy car by calculating how many times and speed of forward drag/swipe or backward/swipe drag across the pads. Furthermore, it is possible to brake the car by rapidly one-time-swipe or gradually stop the car by leaving all fingers from the pads.

Another two copper pads on PCB are for Left and Right direction touch switches. Another one copper pad on PCB is for Power on/off and Light on/off touch switch.

A single or plural number of MCUs on PCBA are for detecting the capacitance change on each copper pad and, transmitting the control signal to the receiving toys thru Infrared (IR) or radio frequency signal.

The controller permits for symmetric product design for left or right hand convention. This is facilitated by placing the IR emitting diodes on upper and lower side. Then the orientation of remote control is not critical. A pair of transmitter IR devices is provided on the housing. One IR device is located in the housing and is for left hand operation of the controller. The other IR device is oppositely located in the housing and is for right hand operation of the controller.

The touch screen of the present disclosure uses touch-sensitive pads and preferably not pressure sensitive buttons or pads. Thus the touch sensitive pads are independent of pressure and the resultant operation will not be responsive or different according to different pressures as applied by user. Irrespective of the applied pressure, the controller gives constant and uniform results.

The touch pads of the controller can be activated by human fingers, not stylus or metal or plastic. The controller operates to be responsive in a swipe and drag function for speed control. Further the touch pad of the disclosure is inset beneath a plastic inlay, such that the touch pad is operated indirectly by the fingers through the inlay. This provides for better security of the components relating to the touch pad controller, and this is uniquely important in toys wherein relatively rough usage is possible. Further by operating the touch pad indirectly, the actual effective operations of the moving characteristics of the toy by signals from the controller are appropriately modulated.

The disclosure is also concerned with energizing one or more touch sensors, such as capacitive touch sensors. Energization can be by a pulse. Changes and variance in capacitance can be detected, and this can include monitoring a touch sensor for decay in the pulse. Changes and variances in capacitance can include discharging the capacitance of the sensors; and measuring the period of time to charge the sensors, charging the capacitance of the sensors: and measuring the period of time to discharge the sensors.

The control circuit can monitor the one or more touch sensors for decay in the pulse to determine when an object has contacted one or more of the touch sensors. The control circuit can detect reduced capacitance in the touch sensors by discharging the capacitance of the sensors then measuring the charge time; detecting reduced capacitance in one or more touch sensors by charging the capacitance in the one or more touch sensors then measures discharge time.

The transmitter can be an infrared transmission circuit, and there can be a resistor-capacitor radio control.

The touch surface comprising one or more touch sensors is arranged in a grid, and the touch sensors can be energized by one or more pulses. The electronics that perceive a human finger contacting the touch surface by monitoring the touch and drag change and creating one or more of a directional control signal and a speed control signal for controlling a remote control toy vehicle based on the perceived touch and drag of the finger on the grid of touch sensors.

Different examples of a remote control device with a touch screen for use with a toy have been shown and described.

In some cases the touch sensors are non capacitive. In that case there is a remote controller for controlling a remote controlled movable toy. The controller comprises a touch surface including at least two touch sensors, each touch sensor corresponding to at least one of touch or drag. The movement of the toy is alterable in correspondence to the touch or drag operation of at least one of the touch sensors. There is a control circuit connected to each of the touch sensors, the control circuit being operational digitally with the touch sensors and being such that a at least one of touching or dragging on the sensor causes a change in a touch sensor. This acts to generate a control signal. There is a transmitter connected to the control circuit wherein on receipt of a control signal by the transmitter, the transmitter transmits a direction or speed signal from the controller to a toy; wherein the change in the touch sensor caused by at least one of touch or dragging is translated as the control signal corresponding to a change in a direction or speed of the toy.

The capacitive touch screen panel includes an insulator such as glass, coated with a transparent conductor such as indium tin oxide. As a finger touches the surface of the screen results in a distortion of the local electrostatic field, measurable as a change in capacitance. Different technologies may be used to determine the location of the touch. There can be a surface capacitance technology; only one side of the insulator is coated with a conductive layer. A small voltage is applied to the layer, resulting in a uniform electrostatic field. When a conductor, such as a human finger, touches the uncoated surface, a capacitor is dynamically formed. The sensor's controller can determine the location of the touch indirectly from the change in the capacitance as measured from the four corners of the panel. A projected capacitive touch technology permits more accurate and flexible operation, by etching the conductive layer. An array is formed, and a voltage to the array creates a grid of capacitors. Bringing a finger or conductive stylus close to the surface of the sensor changes the local electrostatic field.

There are other types of touch screen technology which could be applied. For instance a resistive touch screen could be used. This is composed of several layers, being two thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This causes a change in the electrical current which is registered as a touch event and sent to the controller for processing. Further there can be an infrared touch screen.

There are several principal ways to construct the touch screen. In the capacitive or resistive approach, there are typically four layers: 1. Top polyester layer coated with a transparent metallic conductive coating on the bottom. 2. Adhesive spacer. 3. Glass or plastic layer coated with a transparent metallic conductive coating on the top. 4. Adhesive layer on the backside of the glass or plastic for mounting. The finger touches the touch screen, and this is interpreted as signals to communicate the command to the appropriate application. When a user touches the surface, the system records the change in the electrical current that flows through the display.

Many other variations are possible. The above examples are illustrative only of the disclosure as sought to be claimed.

This disclosure sets out the claimed features in the following claims.

We claim:

1. A remote controller for controlling a remote controlled movable toy, the movement being in the air, on the ground or in water, the controller comprising a touch surface including at least two capacitive touch sensors, each touch sensor corresponding to drag whereby the movement of the toy is alterable in correspondence to the drag operation of at least one of the touch sensors, a control circuit connected to each of the touch sensors, the control circuit being operational digitally with the touch sensors and being such that dragging on the sensor causes a change in capacitance of a touch sensor and thereby acts to generate a control signal; and a transmitter connected to the control circuit wherein on receipt of a control signal by the transmitter, the transmitter transmits a direction or speed signal from the controller to a toy; wherein the change in the capacitance of the touch sensor caused by dragging is translated as the control signal corresponding to a change in a direction or speed of the toy, and including a left and right hand switch related to the control circuit, and a left hand designated touch sensor and a right hand designated touch sensor, and wherein operation of the left and right hand switch functions to switch to be either for a left hand person or for a right hand person operating convention, and renders the touch sensors responsive to the left hand person or the right hand person respectively thereby providing relatively similar operational effect and experience respectively for the left hand person and for the right hand person.

2. The remote controller of claim 1 wherein the touch sensors are mounted in a controller housing, the housing including a body and an operational face, an overlay material on the operational face, and the sensors being located below the operational face.

3. The remote controller of claim 1 wherein the sensors include a first array of sensors the sensors in the array being connected in a physical location relative to the operational face such that change of transverse pressure over different sensors in the array in a lateral sense across the operational face translates into a dragging action to cause a requisite control signal from the controller to the toy, thereby to effect a change in direction or speed of the toy.

4. The remote controller of claim 3 wherein sensors in the array are serially arranged such that changes in different sensors are serially communicated to the control circuit, and wherein the speed of changes from one sensor to another effects changes in the direction or speed signal being transmitted by the transmitter.

5. The remote controller of claim 1 including sensors in a first array and wherein the control circuit and array are arranged such that when the toy is moving, the action of a release of pressure from fingers from sensors in the array effects a stop effect on the toy whereby the toy would be either stationary or slow down to a stationary position, and a braking effect when the toy is moving is activated by a swipe of a sensor.

6. The remote controller of claim 1 including at least one further touch sensor, the further touch sensors being for operational characteristics unrelated to direction or speed change of the toy.

7. The remote control device of claim 1 including a left and right hand switch related to the control circuit, and a left hand designated touch sensor and a right hand designated touch sensor, and wherein operation of the left and right hand switch functions to be either for a left hand person or for a right hand person, and renders the touch sensors responsive to the left hand person or the right hand person respectively thereby providing relatively similar operational effect and experience respectively for the left hand person and for the right hand person.

8. The remote control device of claim 1 including having the touch sensors in the array relate to the control circuit, such that operation of the touch sensor in the array of sensors permit the generation of transmission signal which is selected from the group of stop, accelerate, decelerate, maintain constant speed, proceed forwardly, proceed in reverse, turn left, turn right, toy identification, and light status of the vehicle.

9. The remote control device of claim 1 including having the touch sensors in the array relate to the control circuit, such that operation of the touch sensor in the array of sensors permit the generation of at least three transmission signals which are selected from the group of stop, accelerate, decelerate, maintain constant speed, proceed forwardly, proceed in reverse, turn left, and turn right.

10. The remote control device of claim 1 including having the touch sensors in the array relate to the control circuit, such that operation of the touch sensor in the array of sensors permit the generation of at least six transmission signals which are selected from the group of stop, accelerate, decelerate, maintain constant speed, proceed forwardly, proceed in reverse, turn left, and turn right.

11. The remote control device of claim 1 including having the touch sensors in the array relate to the control circuit, such that operation of the touch sensor in the array of sensors permit the generation of transmission signals which are stop, accelerate, decelerate, maintain constant speed, proceed forwardly, proceed in reverse, turn left, and turn right.

12. The remote control device of claim 1 wherein the sensors are responsive additionally to touching on sensors thereby to causes a change in capacitance of touch sensors and thereby act to generate a control signal.

13. A remote controller for controlling a remote controlled movable toy, the movement being in the air, on the ground or in water, the controller comprising a touch surface including at least two touch sensors, each touch sensor corresponding to drag whereby the movement of the toy is alterable in correspondence to the drag operation of at least one of the touch sensors, a control circuit connected to each of the touch sensors, the control circuit being operational digitally with the touch sensors and being such that dragging on the sensor causes a change in capacitance of a touch sensor and thereby acts to generate a control signal; a transmitter connected to the control circuit wherein on receipt of a control signal by the transmitter, the transmitter transmits a direction or speed signal from the controller to a toy; wherein the change in the capacitance of the touch sensor caused by dragging is translated as the control signal corresponding to a change in a direction or speed of the toy and including a pair of transmitter IR devices, one IR device being located relative to a housing for the controller and being for left hand operation of the controller and the other IR device being oppositely located relative to the housing and being for right hand operation of the controller whereby the one IR device is activated for a left hand user when operating a throttle control, and the other IR device is activated for a right hand user when operating the throttle control, and including a left and right hand switch related to the control circuit, and a left hand designated touch sensor and a right hand designated touch sensor, and wherein operation of the left and right hand switch functions to switch to be either for a left hand person or for a right hand person operating convention, and renders the touch sensors responsive to the left hand person or the right hand person respectively thereby providing relatively similar operational effect and experience respectively for the left hand person and for the right hand person.

14. The remote controller of claim 13 wherein the touch sensors are mounted in a controller housing, the housing including a body and an operational face, an overlay material on the operational face, and the sensors being located below the overlay material.

15. The remote controller of claim 13 wherein the sensors include a first array of sensors, the sensors in the array being connected in a physical location relative to the operational face such that change of transverse pressure over different sensors in the array in a lateral sense across the operational face translates into a dragging action to cause a requisite control signal from the controller to the toy, thereby to effect a change in direction or speed of the toy.

16. The remote controller of claim 13 wherein sensors are serially arranged such that changes in different sensors are serially communicated to the control circuit, and wherein the speed of changes from one sensor to another effects changes in the direction or speed signal being transmitted by the transmitter.

17. The remote controller of claim 13 including sensors in a first array and wherein the control circuit and array are arranged such that when the toy is moving, the action of a release of pressure from fingers from sensors in the array effects a braking effect on the toy whereby the toy would be either stationary or slow down to a stationary position, and including at least one further touch sensor, the further touch sensors being for operational characteristics unrelated to direction or speed change of the toy.

18. The remote control device of claim 13 wherein the sensors are responsive additionally to touching on sensors thereby to causes a change in the touch sensors and thereby act to generate a control signal.

19. A method of controlling a toy comprising the steps of energizing touch sensors; detecting a change in at least one touch sensor; determining the direction and speed represented by the touch sensor in which a change is detected; and transmitting a control signal corresponding to the direction and speed represented by the touch sensor in which a change is detected, the control circuit being operational digitally with the touch sensors and being such that dragging on the sensor causes a change in the touch sensor, wherein when the toy is moving, the action of a release of pressure from fingers from sensor effects a braking effect on the toy whereby the toy would be either stationary or slow down to a stationary position, and including operating the toy unrelated to direction or speed change of the toy; operating the toy to act either for a left hand person or for a right hand person, and rendering the touch sensors responsive to the left hand person or the right hand person respectively thereby providing relatively similar operational effect and experience respectively for the left hand person and for the right hand person, and operating a pair of transmitter IR devices, such that one IR device is for left hand operation of the controller and the other IR device is for right hand operation of the controller, and including a left and right hand switch related to the control circuit, and a left hand designated touch sensor and a right hand designated touch sensor, and wherein operation of the left and right hand switch functions to switch to be either for a left hand person or for a right hand person operating convention, and renders the touch sensors responsive to the left hand person or the right hand person respectively thereby providing relatively similar operational effect and experience respectively for the left hand person and for the right hand person.

* * * * *